March 17, 1931.    T. B. SLATE    1,796,908
REFRIGERATING APPARATUS AND METHOD
Original Filed Sept. 27, 1924
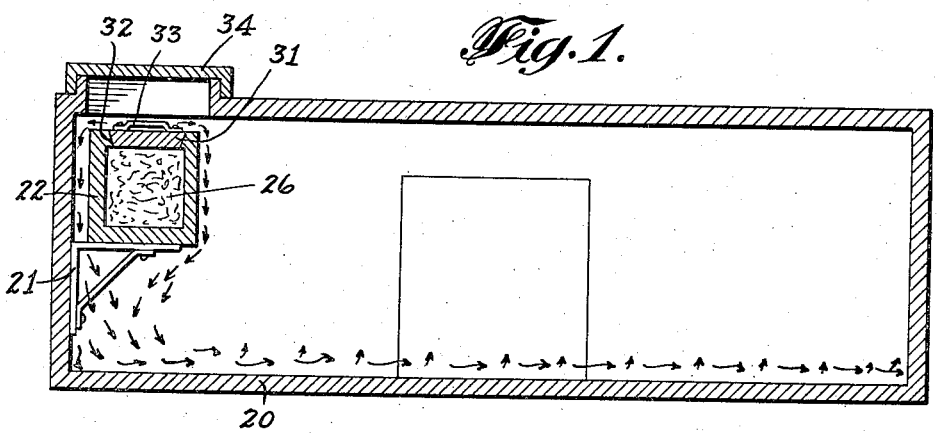
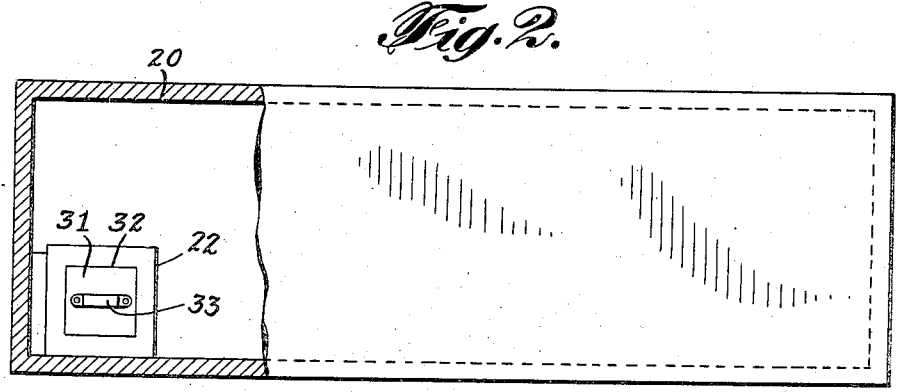
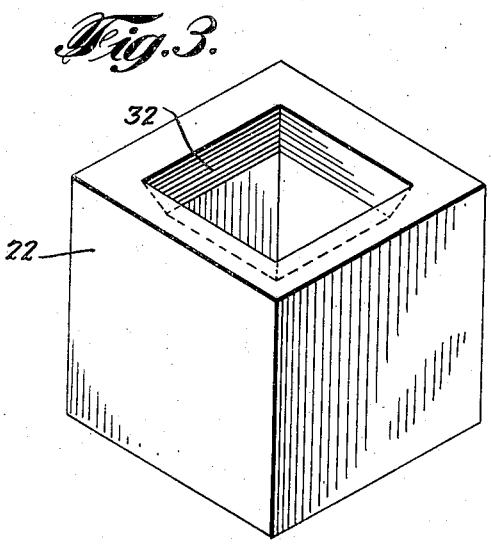
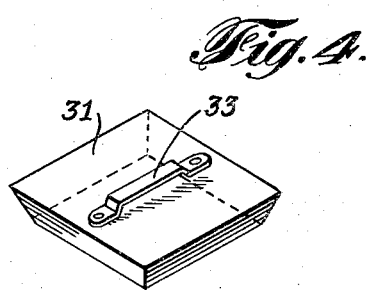
INVENTOR
Thomas B. Slate
BY
George C. Rhean
his ATTORNEY Patented Mar. 17, 1931

1,796,908

UNITED STATES PATENT OFFICE

THOMAS B. SLATE, OF NEW YORK, N. Y., ASSIGNOR, BY MESNE ASSIGNMENTS, TO AMERICAN PATENTS DEVELOPMENT CORPORATION, OF NEW YORK, N. Y., A CORPORATION OF DELAWARE

REFRIGERATING APPARATUS AND METHOD

Application filed September 27, 1924, Serial No. 740,162. Renewed February 17, 1930.

My present invention relates to refrigeration of the type set forth in my application Ser. No. 685,482, filed January 10, 1924, now Patent No. 1,511,306, granted October 14th, 1924.

In said patent I have described and claimed various forms of refrigerators, each characterized by having solidified carbon dioxide enclosed within the refrigerator and discharging gaseous refrigerant in such a way that the gas affords insulation. When discharged into the refrigerated space, it prevents mold and excludes air from the materials that are refrigerated, and otherwise refrigerates and preserves the same.

My present invention includes the general features above described, but relates more specifically to refrigerating chambers and to the container of solid carbon dioxide which is located in the upper part of the chamber and is adapted to be charged with frozen carbon dioxide which has been previously manufactured elsewhere. This container is gastight except for the provision of a high level vent for escape of the gas, in this case, through upwardly extending joints in the cover, or as described in my prior application, now Patent 1,511,306, through a vent hole in the cover itself. It results that when the container is charged with the frozen carbon dioxide, the heavy cold gas evolved therefrom displaces the air and drives it upward, so that the container becomes filled with pure, dry gas which protects the frozen carbon dioxide and greatly decreases its sublimation rate.

In the present case, as in Figs. 7 to 10 inclusive of said patent, there is a chamber refrigerated by a single large container into which all of the frozen carbon dioxide is charged. The container is of insulating material and may be a balsa wood box. It is shown as cubical, thereby affording maximum capacity for minimum area of exterior heat absorption surface. The heat absorption and direct chilling of the atmosphere is localized at and upon this exterior surface, which then becomes in effect a refrigerant source operating at predetermined moderate temperatures, notwithstanding the fact that it is activated from within by the intensely cold primary source—the solid carbon dioxide. The down draft of atmosphere chilled by such surface is correspondingly localized. The evolution of the gas and outpouring of the refrigerant gas is similarly localized. The convection currents operate to distribute these cooling media throughout the car, and to force return circulation of warm air at the top of the car, thereby maintaining an approximation of uniform temperature throughout the car.

What this temperature will be can be controlled within limits by designing the size and insulation of the container so as to predetermine the normal temperature of its exterior surface with reference to the normal rate of heating up of the refrigerated space. The temperature of the exterior heat absorbing surface of the container may be predetermined for relatively high temperatures by providing sufficient thickness and good quality of the heat insulation, thereby predetermining the rate of heat absorption per unit area for any given conditions. The total amount of the heat absorption and the resulting effective temperature of the refrigerated space may be made anything desired, within limits, for given conditions, by providing a sufficient total area of the heat absorbing surface.

According to my present invention, the heat absorbing capacity of the containers may be determined almost entirely by the total heat absorbed from the outside through the walls of the refrigerator car or chamber because the other large factor of refrigeration, namely, heat generation by oxidizing reactions in a cargo of perishable products, such as dead fish or fresh (living) fruits, may be reduced to a minimum by relatively low temperature and exclusion of oxygen which results when the gas is discharged into the refrigerated space. My present invention combines two kinds of refrigeration, both of which may be controlled by the enclosing walls of the container which function in two ways: first, as exterior refrigerant surface, absorbing heat and establishing convection currents by direct contact with atmosphere within the car and thus yielding as moderate, above-freezing refrigeration, a major portion of the refrigerant value of the solid carbon dioxide; second, the walls conduct this heat to the interior of the container, where some of it is absorbed by the gas, but most of it disappears as latent heat used in producing a proportional amount of heavy refrigerant gas and this gas is utilized so as to yield the remaining part of the refrigerant value of the solid as lower temperature refrigeration.

While metal may be used to render the rates at which heat is absorbed by the walls of the container and supplied to the solid carbon dioxide as latent heat for volatilizing it, practically independent of whether the container has a full charge of the solid or only a relatively small fraction. I do not herein specifically claim such feature. If sufficient insulation is used, it is possible to ensure a temperature drop of over 100° F. between the interior and exterior of the container and this is so great that refrigeration of the external atmosphere (heat absorption therefrom) remains fairly constant so long as there is a sufficiently large amount of carbon dioxide in the container.

All the absorbed heat goes into making a fresh cold gas and within limits this constitutes a fairly constant temperature source which does not change area during use as the frozen carbon dioxide necessarily does and hence the containers can be designed for any desired area, particularly where the container is cubical, as shown.

It will be noted that increase of such area increases such rate and that the same effect is producible by decrease of insulation of the surface without changing its area, but in the latter case the result is produced by greater intensity of working of each unit area, instead of by having more units working at unchanged intensity.

My invention demonstrates that intensity as controlled by insulation is important. Moreover, the exterior transition surface where the convection of heat changes to conduction seems to be important as the crest of the dam where the relatively uniform heat of the atmosphere in the refrigerator starts its hundred degree drop to the temperature of the interior of the container. Hence it is possible to design a container to afford the desired refrigeration with only a relatively small normal temperature difference between the exterior surface of the container and the refrigerator atmosphere in which it is submerged. This may be accomplished by providing the container with insulation such that its external surface will operate at a temperature somewhat below the desired refrigerator temperature, when said surface is exposed to air at said desired refrigerator temperature. A rough approximation for fresh fish and other products requiring near-freezing temperatures, may be attained by merely making the insulation such that when exposed to ordinary moist atmosphere, it will collect frost if said atmosphere is near or slightly below the freezing point of water, but will melt the frost or collect only dew when said atmosphere is at predeterminable higher temperatures.

The temperature difference and the refrigerant value per unit surface being thus predetermined, and, so to speak standardized, I simply provide enough such surface to maintain the desired temperature for the particular refrigerator under average conditions of its use. The insulation being considerable, such area must be proportionally great and, in general, a reasonable overestimate for the exterior surface area of the containers is an advantage because it will provide for unusually hot weather and my other factors of governing are controlling enough to prevent freezing in cold weather.

The air and gas absorb and tenaciously hold certain minimum quantities of water down to and far below freezing and actual test seems to prove that a relatively small remnant of it in the atmosphere of the refrigerator will function as a balance wheel, its specific heat opposing temperature change and its latent heat operating by deposit or evaporation of dew near the dew point and of frost near the freezing point thereby releasing heat and drying the gas, thus making it a slower medium for transmission of heat from cargo to container, while evaporation has the opposite effect; each when and where most needed. Frost or dew on the container surfaces adds an effective layer of insulation, thus decreasing production of refrigerant gas, while melting of such frost or evaporation of dew has the opposite effect. The greater the area of the container surfaces relative to the volume of atmosphere in the refrigerator, and the closer up to the freezing point said surfaces are operating, the more important these effects will be. As explained above, these ratios can be made almost anything desired.

Frozen carbon dioxide has a refrigerating value nearly twice that of water ice. Its melting point is about −114° F. where it absorbs heat in latent form, and vaporizes or "sublimates" directly to a gas, without any intermediate liquid state, the practically effective temperature of the gas being about −80° F. Solid carbon dioxide, whether frozen directly or made as snow and then compressed, has a specific gravity nearly twice that of water-ice, a cubic foot of the solid carbon dioxide weighing somewhere between 50 pounds and 100 pounds, according to the degree of compression, and yielding about 8 cubic feet of gas per pound, measured at 32° F. Because of its low temperature and great specific gravity, such gas is nearly twice as heavy as the refrigerator air into which it is discharged. Consequently, when it escapes from the container into the relatively still atmosphere of the refrigerator chamber, it gravitates downward. There will be diffusion, and if the escaping gas has much velocity, there will be some mechanical mixing, but even so, the initial effect will be to build a pool of the cold carbon dioxide gas up from the bottom of the car, displacing the air and warmer carbon dioxide upwards as it rises. This warmer atmosphere flows to the heat absorbing surface of the container. The upper warmer layer naturally increases and decreases in thickness with changes in temperature, particularly intensity of the sun's rays on the roof, and by disposing my containers with their upper surfaces within the range of ebb and flow of thickness of this layer, the thickening and downward extension of the layer brings it in bathing contact with greater areas of the container and thereby affords a magnified heat differential resulting in the production and discharge of an increased amount of the refrigerant gas, which continues until retreat of the warm layer, whether by discontinuance of the sun's heat or as a result of the excess refrigeration.

I now describe apparatus whereby the various features of my method may be realized in almost any desired degree of completeness or perfection. Such apparatus is illustratively indicated in the accompanying drawings, wherein Fig. 1 is a vertical longitudinal section showing a refrigerator car having equipment particularly adapted for the use of solid carbon dioxide in accordance with my present invention;

Fig. 2 is a top plan view of the same partly in longitudinal section;

Fig. 3 is a perspective view of the refrigerant container shown in Figs. 1 and 2; and Fig. 4 is a similar view of a cover for said container.

Referring to Figs. 1 and 2, I provide a solid carbon dioxide chamber 22 for any chamber 20, to be refrigerated, such as a refrigerator car. The chamber 22 is supported on a suitable bracket 21. The chamber 22 is provided with or formed of insulating material which may be balsa wood. This chamber is used as the insulated chamber for the refrigerant 26, which may be compressed cakes of solid carbon dioxide and which may be manufactured elsewhere and delivered to the chamber to be refrigerated. I provide a suitable removable cover 34 on chamber 20 and a removable cover 31 on chamber 22, so that the space 26 is readily accessible for filling when needed. As the solid 26 reverts to a gaseous state, the topmost, lightest portion of the gas which is warmest and most likely to be mixed with air, escapes by overflow through or around the lid 31 of chamber 22, or it may be piped in any suitable manner to any desired part of the chamber 20.

Fig. 3 shows an enlarged view of chamber 22, and Fig. 4 an enlarged view of the cover 31 with a suitable handle 33. It will be noted that this container 22 is cubical and therefore affords the least possible exterior absorption surface, for a given volume or refrigerant capacity. If it is a five-foot cube, as may be inferred from the relative dimensions with respect to the car, as shown in Figs. 1 and 2, its capacity would be about 97 cubic feet of frozen carbon dioxide while its exterior heat absorbing surface would total about 150 square feet. Consequently, if packed with ordinary carbon dioxide snow, shaken down enough to weigh, say, 20 pounds to 25 pounds per cubic foot, its contents would be 2,000 pounds to 2,500 pounds. If charged with the same weight of ordinary compressed blocks of solid carbon dioxide, it would be, say, half full.

Ordinary carbon dioxide snow as formed by expansion of the liquid carbon dioxide, is porous and light, but may be easily compressed to bricks of density even greater than water ice or water itself, a cubic foot weighing, say, 65 pounds, though it may weigh anywhere from 40 pounds to 100 pounds, according to the degree of compression. Such solid carbon dioxide occupies smaller space and is also much more effective per pound than water ice, making it especially valuable for refrigerator cars where space and weight are both expensive.

The carbon dioxide gas from the solid excludes oxygen and has a preservative effect on certain perishable products, so that a combination of slight refrigeration and complete exclusion of atmospheric air will preserve them longer and more completely than any other type of refrigeration. Pure carbon dioxide has an affinity for moisture also that will prevent mold and other damaging effects caused by moisture. This fact is especially valuable for some products that mold very easily from the moisture of ordinary water-ice refrigeration.

With the apparatus shown in Figs. 1 and 2, it will be evident that the container 22 can have its capacity suitably proportioned to the total capacity and contents of the chamber 20 and can have an amount of insulation necessary for the extended refrigeration desired and to prevent such over refrigeration as would be damaging to the products to be refrigerated. Such an apparatus would keep the car cool enough for many purposes, even with the temperature range far enough above freezing to avoid all danger of freezing even under extreme conditions.

In all cases, the heavy intensely cold gas volatilized by heat absorbed through the walls of the container 22 will escape as formed from the topmost level where the gas is warmest and most likely to be mixed with air, through the joints of the cover 31 and will flow directly downward to the bottom of the car with some diffusion, displacing the air upward and itself enveloping and preventing deterioration of perishable products. The cover has great area and fits an outwardly flaring seat, so it is easily forced outward to vent the interior in case the joint becomes seated, as by freezing of moisture or of escaping gas; or there may be a vent hole formed in the cover.

As a contrast to my present invention, it will be seen that no amount of water ice can give temperatures around 29° F., the desirable non-freezing temperatures for fresh fish; also that when water ice is called upon to maintain a temperature only a degree or two above its melting point, there must be an enormous surface of the ice exposed and the air must be circulated thereover with relatively great rapidity. This entails great convection losses and necessitates re-icing long before the ice is gone, merely because its surface cooling area has become too small.

For all the above reasons, my method is commercially advantageous even where solid carbon dioxide costs several times as much as water ice and is a great economy where the cost is only twice as much per pound, because the refrigerant value cost is then approximately the same, but solid carbon dioxide does the work with less refrigerant value per day, and less days are required for the trip, besides saving labor costs for re-icing and the large minimum quantity of water ice which is thrown away at the end of every trip.

For best practice of the invention, it was found desirable to manufacture by a separate process, solid carbon dioxide in the form of blocks free from objectionable impurities such as condensed water or lubricating oil, the blocks having dense, smooth surfaces, containing about 100 pounds of carbon dioxide. The surfaces rapidly collect frost from the atmosphere but being smooth and dense the frost may be cleaned off before charging the blocks into the container. The latter may also be freed from ice and its atmosphere then dried by a preliminary freezing out with carbon dioxide, but the latter precaution is usually unnecessary. While the above perfections as to purity of the frozen carbon dioxide are desirable for best practice of my invention, it will be evident that the same principles may be applied in the use of solidified carbon dioxide with almost any admixture of other liquids or materials, provided the product is standardized within limits which will permit designing apparatus to suit the evaporating temperature and the refrigerant values of such composite products.

I claim:

1. A refrigerator and a permanently insulated container therein for refrigerating perishable products, said container enclosing solid cakes of frozen carbon dioxide sufficient for a long period deriving heat from and discharging the resultant cold gas into the atmosphere containing said products, the surface area of the insulated container being great as compared with its capacity, the thickness of the insulation of the container being such that the contained refrigerant tends to maintain the outer surface of the insulation near the freezing point of water, so that such surface will collect frost from the refrigerator atmosphere at or below the freezing point of water, and will permit evaporation or melting of such frost to decrease its insulating effect when said atmosphere is at a temperature above the range for which refrigeration is desired.

2. A method of refrigeration which includes enclosing within a chamber with the material to be refrigerated, a quantity of permanently insulated solid carbon dioxide which on absorption of heat from the atmosphere within the chamber, passes directly from the solid to the gaseous state; and permitting all the gas thus formed to escape into the atmosphere of said chamber in the upper part thereof; and predetermining the temperature range of the refrigeration near the freezing point of water by predetermining the amount of active heat absorbing area of the container with reference to the size and average heat absorption rate of said enclosing chamber.

3. A method of refrigeration which includes enclosing within a chamber with the material to be refrigerated, a quantity of solidified carbon dioxide which on absorption of heat from the atmosphere within the chamber, passes directly from the solid to the gaseous state, and permitting all the gas thus formed to escape into the atmosphere of said chamber; permanently insulating the solid sufficiently to establish a desired low rate of consumption thereof and to ensure a relatively small temperature drop between said atmosphere and the heat absorbing surfaces of the container; and regulating the amount or rate of refrigeration by the area of such surfaces.

4. A container and solidified carbon dioxide within said container, said container being practically gas-tight except for a high level outlet; whereby heavy cold gas evolved from the solid operates to drive out the upper, warmer, less pure part of the atmosphere within the container, for the purpose and with the result that in continued operation the solid is completely submerged in the purest part of the gas.

5. A method of decreasing the melting rate of solidified carbon dioxide, which method includes enclosing the same in a container the bottom and walls of which are substantially gas-tight and utilizing the pressure of gas evaporated from the solid to expel only the warmer or less pure gas, from the uppermost portion of said container.

6. A container and solidified carbon dioxide within said container, said container being practically gas-tight except for a high level outlet; said high level outlet having its flow capacity limited in relation to the normal gas output of the container so that there will be continuous outflow of gas, thereby preventing inbreathing of air.

7. A method of refrigeration which includes enclosing solid carbon dioxide in an insulating chamber, affording escape paths for outflow of gas evaporating from the solid and relatively proportioning normal gas output and outflow capacity of escape paths so that there will be normally continuous outflow of gas, thereby preventing inbreathing of air.

8. A refrigerator and a permanently insulated container therein for refrigerating perishable products, said container enclosing solid cakes of frozen carbon dioxide sufficient for a long period deriving heat from the atmosphere containing said products, the surface area of the insulated container being great as compared with its capacity, the thickness of the insulation of the container being such that the contained refrigerant tends to maintain the outer surface of the insulation near the freezing point of water, so that such surface will collect frost from the refrigerator atmosphere at or below the freezing point of water, and will permit evaporation or melting of such frost to decrease its insulating effect when said atmosphere is at a temperature above the range for which refrigeration is desired.

9. A method of refrigeration which includes enclosing within a chamber with the material to be refrigerated, a quantity of permanently and heavily insulated solid carbon dioxide which on absorption of heat from the atmosphere within the chamber, passes directly from the solid to the gaseous state; and predetermining the temperature range of the refrigeration near the freezing point of water by predetermining the amount of active heat absorbing area of the container with reference to the size and average heat absorption rate of said enclosing chamber.

10. A method of refrigeration which includes enclosing within a chamber with the material to be refrigerated, a quantity of solidified carbon dioxide which on absorption of heat from the atmosphere within the chamber, passes directly from the solid to the gaseous state, permanently insulating the solid sufficiently to establish a desired low rate of consumption thereof and to ensure a relatively small temperature drop between said atmosphere and the heat absorbing surfaces of the container; and regulating the amount or rate of refrigeration by the area of such surfaces.

11. A refrigerator having at a high level therein, a container and solidified carbon dioxide within said container, said container being practically gas-tight except for a high level outlet; whereby heavy cold gas evolved from the solid operates to drive out the upper, warmer, less pure part of the atmosphere within the container, for the purpose and with the result that in continued operation the solid is completely submerged in the purest part of the gas.

12. A method of refrigerating a chamber, which method includes enclosing solidified carbon dioxide in a container absorbing heat from an upper portion of the atmosphere of said container, the bottom and walls of the container being substantially gas-tight and utilizing the pressure of gas evaporated from the solid to expel only the warmer or less pure gas, from the uppermost portion of said container.

13. A refrigerator having therein a container and solidified carbon dioxide within said container, said container absorbing heat from an upper portion of the atmosphere of the refrigerator, and being practically gas-tight except for a high level outlet; said high level outlet having its flow capacity limited in relation to the normal gas output of the container so that there will be continuous outflow of gas, thereby preventing inbreathing of air.

Signed at New York city, in the county of New York and State of New York, this 24th day of September, A. D. 1924.

THOMAS B. SLATE.